United States Patent [19]
Weinert

[11] Patent Number: 6,124,991
[45] Date of Patent: Sep. 26, 2000

[54] PROCESS AND DEVICE FOR READING OUT BINARY INFORMATION MAGNETICALLY STORED IN A TRANSPARENT MAGNETIC LAYER

[75] Inventor: Volker Weinert, Taufkirchen, Germany

[73] Assignee: Agfa Gavaert Aktiengesellschaft, Leverkusen, Germany

[21] Appl. No.: 08/913,696

[22] PCT Filed: Mar. 13, 1996

[86] PCT No.: PCT/EP96/01058

§ 371 Date: Sep. 10, 1997

§ 102(e) Date: Sep. 10, 1997

[87] PCT Pub. No.: WO96/31802

PCT Pub. Date: Oct. 10, 1996

[30] Foreign Application Priority Data

Apr. 7, 1995 [DE] Germany ............... 195 13 260

[51] Int. Cl.[7] .............. G11B 5/00; G11B 5/09; G11B 5/035; G03B 17/24
[52] U.S. Cl. ................ 360/1; 360/46; 360/65; 396/319
[58] Field of Search ............... 360/1, 3, 46, 65; 396/319; 327/335

[56] References Cited

U.S. PATENT DOCUMENTS

| | | | |
|---|---|---|---|
| 5,055,938 | 10/1991 | Misumi et al. | 360/25 |
| 5,237,464 | 8/1993 | Cronch et al. | 360/46 |
| 5,270,875 | 12/1993 | Shah et al. | 360/65 |
| 5,490,018 | 2/1996 | Yamashita | 360/32 |
| 5,519,462 | 5/1996 | Spencer et al. | 360/3 |

*Primary Examiner*—Paul Loomis
*Assistant Examiner*—Regina Y. Neal
*Attorney, Agent, or Firm*—Milde, Hoffberg & Macklin, LLP

[57] ABSTRACT

The invention is based on a process for reading out binary information magnetically stored in a transparent magnetic layer (1) in which the signals supplied by a magnetic read head (3), pressed against the magnetic layer, (1) is preamplified, frequency-filtered and evaluated. The preamplified signals are filtered in different filter frequency (10a–10d) ranges and differentiated (11–14), and the signal with the most plausible bit sequence is selected from these signals of the various frequency ranges for further processing.

24 Claims, 4 Drawing Sheets

PROCESS AND DEVICE FOR READING OUT BINARY INFORMATION MAGNETICALLY STORED IN A TRANSPARENT MAGNETIC LAYER

CROSS-REFERENCE TO RELATED APPLICATION

This application is related to the commonly assigned U.S. patent application Ser. No. 08/913,695, filed Sep. 10, 1997 entitled "PROCESS AND DEVICE FOR READING MAGNETICALLY RECORDED SIGNALS" (now allowed) and a 371 of PCT/EP 96/01058, filed Mar. 13, 1996.

BACKGROUND OF THE INVENTION

The invention is a process and a device for reading out binary information magnetically stored on a transparent magnetic layer. Transparent magnetic layers have recently become well known in photographic films, where they are used to record information for illumination and/or processing of photographic films according to the invention and to maintain data for access in devices used in processing. Because of the requirement that photographic films can not be altered essentially in their capacity to store images and thus in their transparency, these magnetic layers can contain only very little material. The magnetic fields of recorded signals are correspondingly weak; they may be lower by a factor of 200 than fields for customary sound and data recordings on nontransparent magnetic tapes or disks designed exclusively for that purpose.

Special measures must thus be taken for capturing and processing magnetic signals which make up the kind of magnetic code as, for example, described in the U.S. Pat. No. 4,987,439. Special amplification and means for evaluation have been developed as, for example, disclosed in the U.S. Pat. No. 4,964,139 for processing weak signals produced by magnetic heads. There a circuit with a single filter 18 is described whose purpose is to eliminate interference signals like the intrinsic noise of a pre-amplifier. It is extraordinarily difficult to tune a filter to multiple interference frequencies caused by various different recording speeds or densities.

SUMMARY OF THE INVENTION

The purpose of the invention is therefore to create an evaluation device suitable for the evaluation of extremely weak and/or varying magnetic signals.

This task is solved by

A process comprising the steps of filtering the preamplified signals at different filter frequency ranges, and differentiating the filter signals, such that those signals of the different filter frequency ranges which have the most plausible sequence of extreme values may be selected for further process.

Through development of the evaluation device according to the invention it is no longer necessary to separate the signal read out by the magnetic head and amplified by the amplifier with a single frequency filter from interference signals. Now the signal read-out and amplified signal are subjected to filtering through a number of various frequency filters and the preferred impulses are selected as bits on the basis of plausibility considerations and agreement from the different filtered signal sequences. Useful configurations of the invention bear on the kind of filtering sequence and differentiation, suppression of interference signals, as well as a device for carrying out the process.

Details concerning the embodiment of the invention are described in detail in Figures.

DESCRIPTION OF THE PREFERRED EMBODIMENTS

Figure 1:
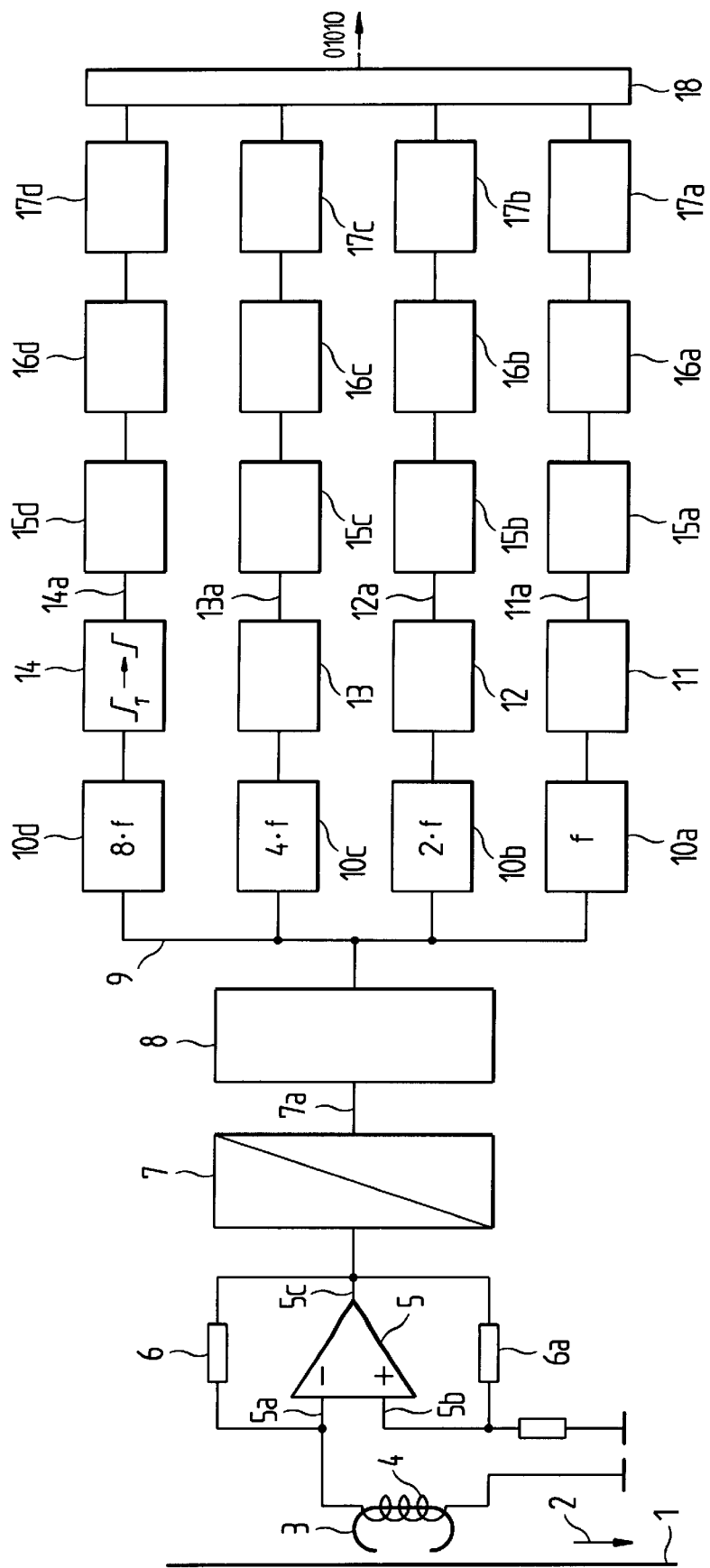
FIG. 1 a total schematic of the construction of the circuit for signal amplification and evaluation.

In FIG. 1, a photographic film strip with a very thin magnetic layer is designated as 1. It is led past a magnetic read head 3 with a coil 4 in the direction of the arrow 2 in a film processing apparatus, for example a photographic printing machine. Coil 4, connected on one side to ground, is connected on its other end with the negative input 5a of an operational amplifier 5. Its output 5c is connected with the input 5a by a feedback resistance 6, which has a very high resistance of some ten MΩ. Operational amplifier 5 has a very high no-load amplification $A_0$ of more than $10^6$ and an insignificant intrinsic noise. The positive input 5b of amplifier 5 is connected via positive feedback to a resistance network containing a resistance 6a so that extensive compensation of internal resistance of the magnetic head coil 4 is achieved. With such a relationship of feed-back resistance 6, no-load amplification $A_0$ of more than $10^6$, and a magnetic head coil 4 with the lowest possible resistance, the magnetic head can in practice be used in short-circuit operation.

Figure 2:
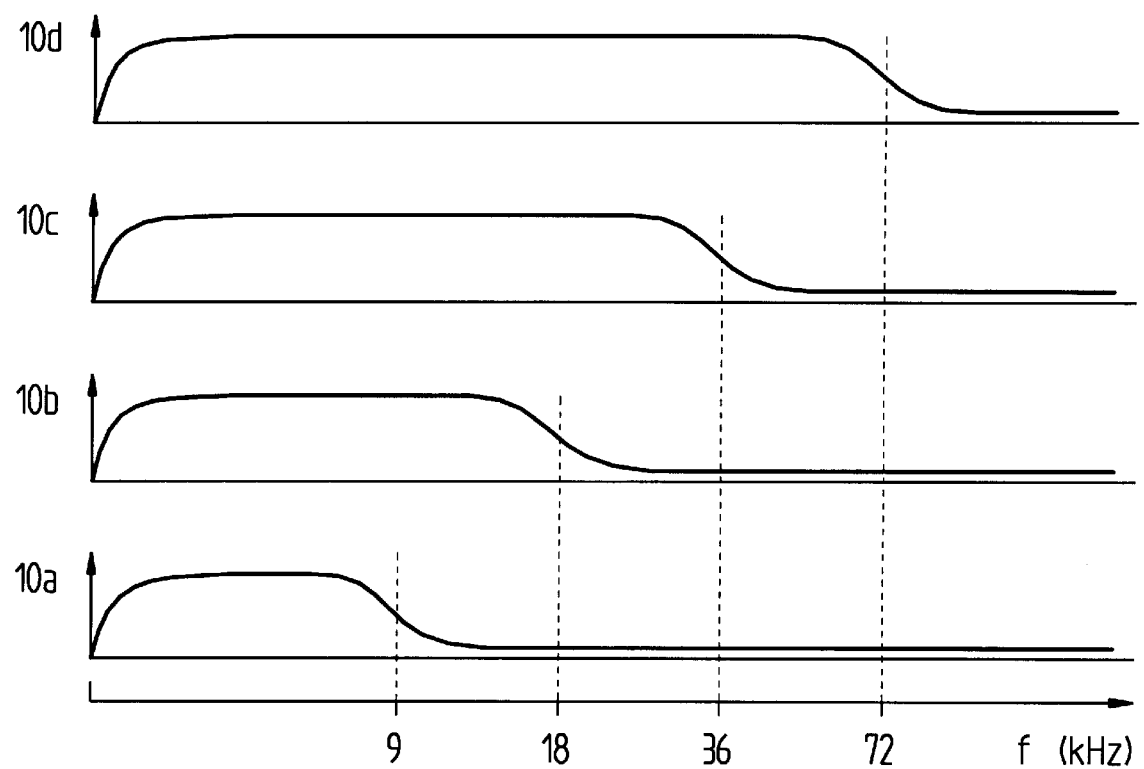
FIG. 2 the transmission characteristics of the frequency filters used.

Output 5c of pre-amplifier 5 is connected with an analog-digital converter 7 which digitizes the amplified analog magnetic head signal with a sufficiently high sampling frequency very strongly dependent on the frequency response and relative speed between the film 1 and the magnetic head 3. For example, a digitization frequency of at least 250 kHz is required with a film transport speed of 30 cm/sec at the magnetic head. This corresponds to a cycle time of 4 μs. With a lower transport speed of the film the sampling frequency of the analog-digital converter can correspondingly be reduced. The digital output signal in circuit 7a is directed to a data buffer 8 for asynchronous processing. Its output is connected via circuit 9 with 4 processing channels arranged in parallel at the beginning of which are frequency filters 10a, 10b, 10c, and 10d. Their transmission characteristics are illustrated in FIG. 2. It can be seen from this that these frequency filters are low pass filters which are substantially impassable to the frequency spectrum lying above the cut-off frequency. Lower frequencies within a certain transition area are transmitted in almost full strength near the cut-off frequency.

For each of the four diagrams arranged above each other in FIG. 2, whose x-axes are shown in logarithmic scale, a transmission curve of the filters 10a–10d is represented which rises from an initial frequency to the maximum transmission and at each cut-off frequency quickly falls to almost 0. The cut-off frequencies of filters 10a to 10d differ by a constant factor, specifically by the whole number 2. That means that the cut-off frequency of filter 10a in the example given is at 9 kHz, for filter 10b at 18 kHz, for filter 10c at 36 kHz, and for 10d at 72 kHz. These cut-off frequencies must clearly lie below the sampling frequency of analog-digital converter 7; in particular the highest filter cut-off frequency of about 72 kHz is lower by a factor of 3 than the sampling frequency of 250 kHz.

Naturally a greater number of filter channels could be implemented, but the described exemplary embodiment with cut-off frequencies between 9 and 72 kHz may yield a clear difference in the frequency content of the output signal. In comparison with the various filtered signals, there is indeed a predominance of the proportion of frequencies which were filtered out in the next lower signal.

Figure 3:
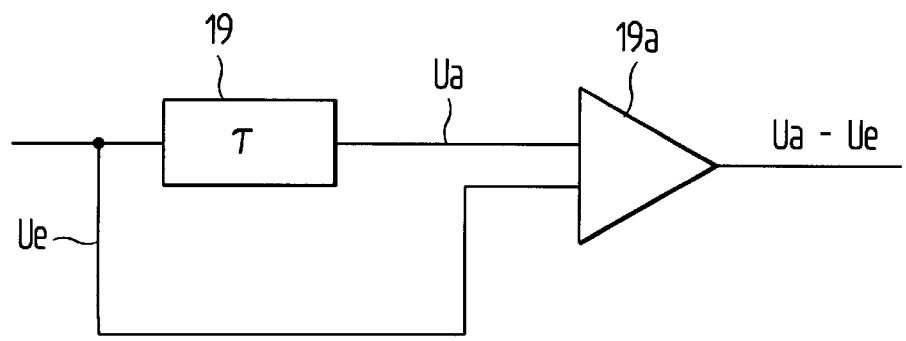
FIG. 3 the configuration for time delay of filtered signals.

According to FIG. 1 the signals amplified and filtered for frequency are directed farther to differentiation devices 11 to 14. Normally differentiation in signal processing is accomplished by insertion of a capacitor. This kind of differentiation has considerable disadvantages, however, in a signal with strong noise. Differentiation by means of a capacitor yields amplification of high frequency noise, which in this case is not desirable. Production of a gradient signal from the amplified and filtered signal is therefore accomplished in the manner described in FIGS. 3 and 4. In accordance with FIG. 3 a delay member 19 is inserted in the path of the output signal $U_e$, which produces a signal $U_a$ delayed by an amount $\tau$. The amount of time delay $\tau$ must be determined with consideration of the amount of time required for the rise of the signal from a minimum to a maximum, so that the greatest possible amount of change in the signal can be evaluated in the shortest possible time by differential formation in differential calculation device 19a. Experimental testing has shown that these premises are fulfilled best when time delay $\tau$ is chosen dependent on the wave length of the associated filter cut-off frequency, in particular approximately double the period of oscillation of the associated cut-off frequency.

Figure 4:
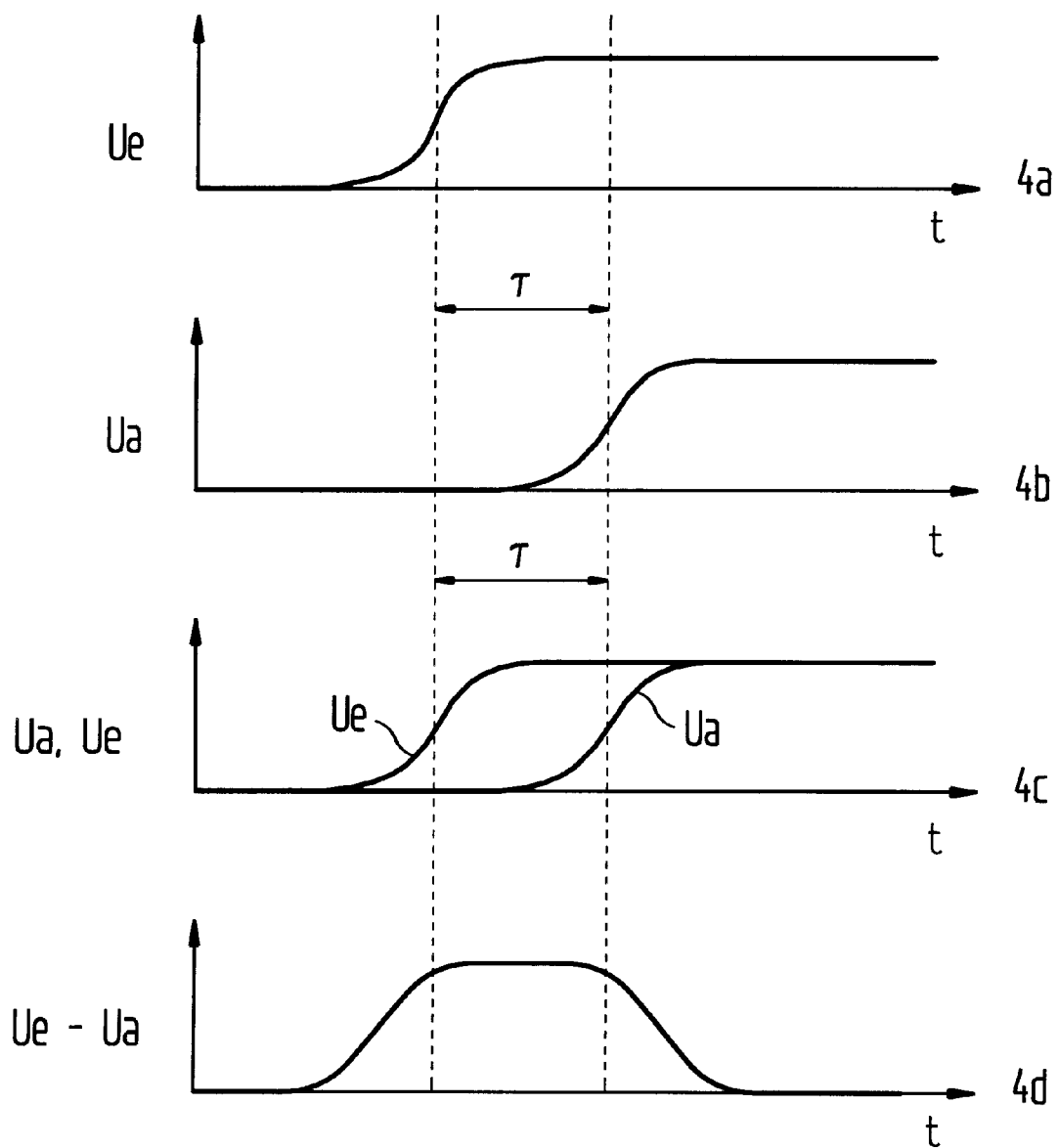
FIG. 4 the principle of differential subtraction of original and delayed signals.

In FIG. 4, a rise of the filtered signal $U_e$ is illustrated in 4a; in FIG. 4b the signal $U_a$ is time-delayed by an amount $\tau$. In FIG. 4c these two signals $U_e$ and $U_a$ are illustrated, and FIG. 4d shows the difference $U_e$-$U_a$. This differential signal indicates the magnitude of the change of signal in the range of $\tau$, therefore a differential signal of low noise which represents the average climb gradients of the filtered signal.

Figure 5:
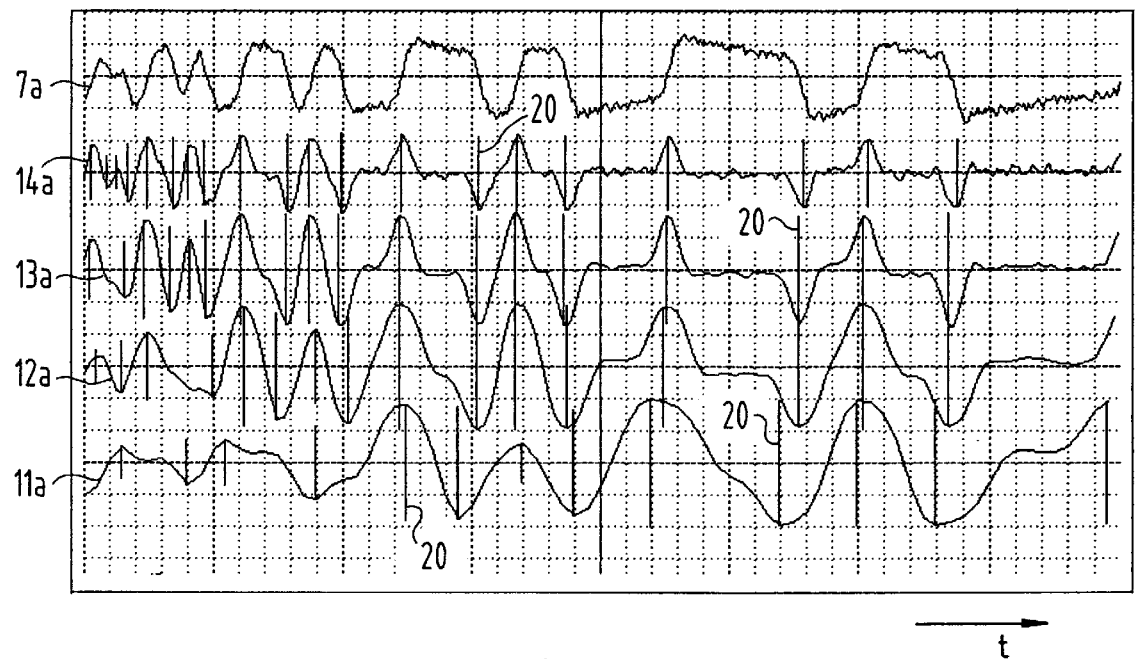
FIG. 5 examples of the route of differently filtered and differentiated signals as well as for testing established extreme values and their digitization into bits.

In FIG. 5, signals originally recorded at the output of the analog-digital converter 7a are compared with filtered and differentiated signals of different channels at the output of the differential calculation devices 11a, 12a, 13a, and 14a. It is worth noting that the recording speed rises across the whole length of the diagram or the sampling speed declines and with it the interval between positive maximums increases both in curve 7a and in curves 14a–11a. This effect can, for example, be brought about by the starting of the film transport mechanism and the starting of the signal recording device in a battery-operated camera. The lower relative speed also led to an amplified noise in curve 14a. The noise component is especially high here because the time-delayed noise component of the signal clearly sinks under the cut-off frequency of 72 kHz. This noise component can, however, be eliminated for the most part by the lower cut-off frequencies of filters in channels 11–13; particularly in curve 12a it is obviously no longer interfering. On the other hand extreme values are suppressed under the zero line by the still lower cut-off frequency of filter 11, so that this frequency is eliminated from the later evaluation.

Before the variously filtered and differentiated signals in channels 11 and 14 are compared and the most plausible signals are evaluated as bit patterns, a process of elimination of signals which on the basis of their position or size do not belong in a bit pattern is carried out in a further stage 15a, 15b, 15c, and 15d. First it is established in each of the circuits 15a–15d which periods of oscillation an acceptable bit length can have. This naturally depends on the dominating frequency of the signal after the process of filtering and differentiation. Experimental tests have established that an extreme value is acceptable or plausible as part of a bit pattern when the recognized bit length corresponding to a basic wave length, namely the interval of two identical positive extreme values with an intermediary extreme value of reversed sign, lies between the single and the doubled period of oscillation. If, for example, the cut-off frequency of filter 10d amounts to 72 kHz, which corresponds to a period of oscillation of about 14 $\mu$S, it will be accepted as a bit length if the interval of two positive extreme values lies between 14 and 30 $\mu$s. As additional criteria for the elimination of not unambiguously identifiable bit patterns, the fact can be used that the time interval between two differently directed extreme values in relationship to the probable bit interval is too small or that the amplitudes of two successive differently directed extremes is too small in comparison with the previous extreme value differences.

The peak values found on the basis of tests with a subsequently added peak value detector 16a–d or signals recognized as extreme values are represented in FIG. 5 by vertical lines 20. This is accomplished electronically by digitizers 17a–d. This drawing also takes into account that the successive extreme values can be recognized only as part of a bit pattern when they have alternating signs.

Figure 6:
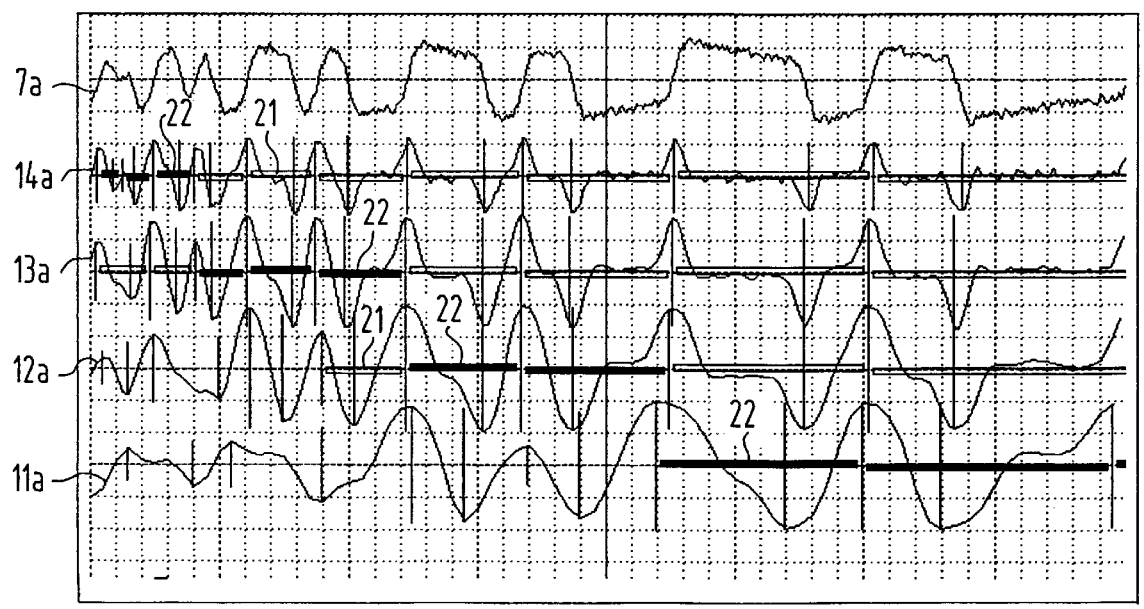
FIG. 6 Examples of the evaluation of bit values as bit lengths in filtered and differentiated signals according to FIG. 5.

In FIG. 6, evaluations of the differentiated curves 11a–14a as in FIG. 5 are illustrated with horizontal bars between two equidirectional, positive extreme values which correspond to the plausibility requirements of the interference signal corrector 15.

By comparison of the different filter signal curves 11a, 12a, 13a, 14a, etc. of the bars given there for the probable bit length 21 it can be decided which of the bars 21 in this time range or signal range can be recognized as having the most secure bit patterns and then be illustrated as characterized by the black bar 22. Criteria already used in stage 15 can in principle be used for this selection, whereby it must be decided which of the possible bit lengths from the different channels best fulfill the criterion. Other criteria can be used in a manner whereby either individually determined cut-off values are compared for each channel or bit lengths occurring approximately at the same time are compared. The following criteria have emerged as appropriate either alone or combined:

bit lengths 21 agree in different channels in timing and length;

the bit lengths lie between whole and doubled wave lengths of the associated filter cut-off frequency; and the interrogation of possible bit lengths proceeds from the higher filter cut-off frequency to the lower until a bit length is found in the acceptable range.

In the bit patterns recognized as acceptable a decision is then made as to whether the bit represents a 0 or a 1 on the basis of the position of the opposite-directed bit lying between the two equidirectional extreme values.

In place of the low-pass filters 10a–10d, narrow-band filters can also be used which cut off the bottom frequency range. Stronger emphasis on high-frequency signal components is also supported by the kind of difference formation in FIGS. 3 and 4.

The functions of components 10–18 in FIG. 1 can also be carried out by a single appropriately programmed microprocessor or a digital signal processor.

Filtering the pre-amplified signals with different filter frequency ranges can also be carried out sequentially if appropriate memory for the pre-amplified signal is provided from which a signal can be extracted for filtering.

The described pre-amplification of magnetic read-out head signals by means of short-circuit operation makes possible especially advantageous differential formation after frequency filtering.

There has thus been shown and described a novel process and device for reading out binary information magnetically stored in a transparent magnetic layer which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a process for reading out binary information magnetically stored in a transparent magnetic layer, wherein signals produced by a magnetic read head, applied against the magnetic layer, are pre-amplified, frequency-filtered, and then evaluated, the improvement comprising the steps of filtering the pre-amplified signals at different filter frequency ranges, thereby to produce a plurality of filtered signal curves which contain images of the binary information;
    differentiating the filtered signals;
    determining the position and direction of extreme values in the individual filtered signal curves; and
    selecting two successive extreme values of the same direction in one of the filtered signal curves to obtain one of the bits of the binary information;
    whereby the two extreme values are selected in dependence upon their positions in, and the filter frequency range of, their respective filtered signal curve.

2. A process according to claim 1, wherein the pre-amplified signals before filtering are digitized with a scanning frequency which is a multiple of the highest filter frequency.

3. A process according to claim 2, wherein the scanning frequency is at least three times the highest filter frequency.

4. A process according to claim 1, wherein low-pass filters of different cut-off frequencies are used in the filtering step.

5. A process according to claim 4, wherein adjacent ones of said filter cut-off frequencies differ by a constant.

6. A process according to claim 5, wherein said filter cut-off frequencies differ by an integer factor.

7. A process according to claim 6, wherein the integer factor is a factor of 2.

8. A process according to claim 1, wherein the filtering step is carried out in a per-unit-time parallel manner with frequency filters each having a different cut-off frequency.

9. A process according to claim 1, wherein the differentiation step is carried out by a signal delay of the filter output signals by a time $\tau$ and by formation of a differential between the original filter output signal and the delayed signal.

10. A process according to claim 9, wherein the time $\tau$ of the signal delay is determined differently in each filter channel.

11. A process according to claim 10, wherein the signal delay time decreases with an increasing filter cut-off frequency.

12. A process according to claim 10, wherein the time $\tau$ in the respective filter channel is approximately twice as great as the period of oscillation of the associated filter cut-off frequency.

13. A process according to claim 1, wherein the differentiated signals of the various filter channels are examined as to the distance between consecutive, differently directed extreme values, and wherein any intermediary extreme values are suppressed because of at least one of (a) too short a time period between acknowledged extreme values in relation to the presumptive bit length of a given channel, and (b) an amplitude that is too low in comparison with other extreme value differentials.

14. A process according to claim 1, further comprising the step of determining the distance between two adjacent extreme values of the same direction, and wherein the evaluation of the extreme values is dependent upon this distance.

15. In a device for reading out binary information magnetically stored in a transparent magnetic layer, wherein there is carried out a frequency filtering in a circuit for detection of binary information in the signals from a magnetic read head which is applied to the transparent magnetic layer of a photographic film and advanced in relation thereto, the improvement wherein said magnetic read head is coupled to a pre-amplifier, and wherein the pre-amplifier is coupled to a plurality of evaluation channels having various frequency filters, to which a downstream connection is provided in the following order: a differentiating device, a peak value detector, and a common selector.

16. A device according to claim 15, wherein there are provided four parallel evaluation channels, the filters of which are designed as low pass filters having a constant factor of different cut-off frequencies.

17. A device according to claim 16, wherein the constant factor of the low pass filter cut-off frequencies is an integer.

18. A device according to claim 17, wherein the integer is 2.

19. A device according to claim 15, further comprising a digital computing means for the filtering of the digitized signals, for the differential formation, for the separation of interference signals, and for the peak value detection.

20. A device according to claim 19, wherein the digital computing means is a custom programmed microprocessor or digital signal processor, which compares the bits from the various channels and selects one of these bit lengths to be correct in accordance with certain criteria.

21. A device according to claim 20, where in the bit length correspondence as to position is retrieved as the selective criterion.

22. A device according to claim 20, wherein the bit length in different channels is retrieved as the selective criterion.

23. A device according to claim 20, wherein correspondence as to bit length in a channel relative to the length of the bit which was last assessed as valid is retrieved as selective criterion.

24. The device according to claim 15, wherein the magnetic read head is operated through the pre-amplifier in short circuit.

* * * * *